United States Patent
Corry et al.

(10) Patent No.: US 9,021,421 B1
(45) Date of Patent: Apr. 28, 2015

(54) READ AND WRITE BARRIERS FOR FLEXIBLE AND EFFICIENT GARBAGE COLLECTION

(75) Inventors: Erik Corry, Tranbjerg J (DK); Vyacheslav Egorov, Aarhus C (DK)

(73) Assignee: Google Inc., Mountain View, CA (US)

( * ) Notice: Subject to any disclaimer, the term of this patent is extended or adjusted under 35 U.S.C. 154(b) by 392 days.

(21) Appl. No.: 13/465,980

(22) Filed: May 7, 2012

(51) Int. Cl.
| | | |
|---|---|---|
| G06F 9/44 | (2006.01) | |
| G06F 12/00 | (2006.01) | |
| G06F 13/00 | (2006.01) | |
| G06F 9/45 | (2006.01) | |
| G06F 12/02 | (2006.01) | |

(52) U.S. Cl.
CPC .................................. *G06F 12/0253* (2013.01)

(58) Field of Classification Search
None
See application file for complete search history.

(56) References Cited

U.S. PATENT DOCUMENTS

| | | | | | |
|---|---|---|---|---|---|
| 5,088,036 | A | * | 2/1992 | Ellis et al. ............................... | 1/1 |
| 5,949,972 | A | * | 9/1999 | Applegate ....................... | 714/54 |
| 2003/0208500 | A1 | * | 11/2003 | Daynes et al. ................. | 707/100 |
| 2004/0187102 | A1 | * | 9/2004 | Garthwaite .................... | 717/160 |
| 2005/0165794 | A1 | * | 7/2005 | Mosescu ........................ | 707/100 |
| 2005/0198620 | A1 | * | 9/2005 | Mathiske et al. ............. | 717/124 |
| 2006/0107251 | A1 | * | 5/2006 | Boshier et al. ................ | 717/108 |
| 2011/0004869 | A1 | * | 1/2011 | Kawahito et al. ............. | 717/151 |
| 2011/0264713 | A1 | | 10/2011 | Ylonen | |
| 2012/0117355 | A1 | * | 5/2012 | Campbell et al. ............. | 711/206 |

* cited by examiner

*Primary Examiner* — Lewis A Bullock, Jr.
*Assistant Examiner* — Jacob Dascomb
(74) *Attorney, Agent, or Firm* — McDermott Will & Emery LLP

(57) ABSTRACT

Described herein are techniques to provide read and write barriers for flexible and efficient garbage collection. A memory heap is split into pages. Each page is aligned to an address that is a multiple of a particular power of two. When generating read and write operations, code is generated to execute the write barrier or the read barrier. At this point, the page alignment for each pointer is known; for example, if the page alignment is the same for all pointers in the system. With this page structure, it is possible to find the page start by masking the address of any heap allocated object on the page with a mask based on the page alignment (bitwise-and operation). A plurality of flags are established on a page. This Abstract is submitted with the understanding that it will not be used to interpret or limit the scope or meaning of the claims.

42 Claims, 5 Drawing Sheets

READ AND WRITE BARRIERS FOR FLEXIBLE AND EFFICIENT GARBAGE COLLECTION

BACKGROUND

A program in execution needs memory to store the data manipulated by the program. Memory is allocated in various ways. In the earliest form of memory allocation, called static allocation, a variable was bound to a chunk of memory at compile time and did not change throughout the program execution. In the case of stack allocation, the binding was created during the invocation of the function that has the variable in its scope and lasts for the lifetime of the function. In heap allocation, the binding was created explicitly by executing a statement that allocates a chunk of memory and explicitly binds an access expression to the chunk of memory.

An object is a collection of data in memory that is stored at consecutive addresses. Unless the object is extremely small, objects are located at more than one address and in some systems can move. A pointer is an instance of a programming language data type whose value refers directly to (or 'points to') an object stored elsewhere in the memory using its address. Conventionally, the address of the start of the object is used. This is the address of the piece of data belonging to the object that has the lowest numerical value. The parts of which an object is comprised can be called fields, elements, properties, members or slots.

An access expression is a generalization of a variable and denotes an object. Access expressions can be part of objects. One of the ways in which the binding between an access expression and an object can be undone is by disposing of the activation record that contains the access expression. Then, the access expression ceases to have any meaning.

The other way is to execute an assignment statement that will bind the access expression to a different object or no object at all. After a binding is changed, the chunk of memory containing an object may be unreachable. Since an object may contain access expressions, this may lead to other chunks of memory becoming unreachable. An issue is the reclamation of such unreachable memory. The reclaimed memory can be subsequently allocated to different objects whose addresses are bound to different access expression.

An automatic tool that can detect unreachable memory and reclaim it frees the programmer from concerns of memory management. In the context of heap allocation, an unreachable memory chunk is called garbage, and a tool that detects and collects garbage is called a garbage collector. The executing program whose memory requirements are being serviced by the garbage collector is called the mutator. A garbage collector is an advanced 'memory manager'. The term memory manager is used herein to designate a more general concept than does garbage collector.

During the course of operation, the mutator occasionally needs to adjust the data that the garbage collection subsystem maintains. This can happen when the mutator writes a value to memory, modifying that memory. Conversely, the garbage collector occasionally needs to adjust the data that the mutator is using. This can happen when the mutator reads a value from memory. These adjustments are controlled by so-called 'read barriers' and 'write barriers', which determine which mutator operations require special processing and ensure that the special processing takes place. Barriers are single or multiple instructions inserted at the relevant points in the mutator code for this purpose.

Many garbage copying garbage collectors use short pauses, during which the garbage collectors perform garbage collection (often using independently collectable regions to make the collection incremental). In many applications, such as real time data streaming, the shorter the pause time the better.

SUMMARY

Described herein are techniques to provide read and write barriers for flexible and efficient garbage collection. A memory heap is split into pages. Each page is aligned to an address that is a multiple of a particular power of two. When generating read and write operations, code is generated to execute the write barrier or the read barrier. At this point, the page alignment for each pointer is known; for example, if the page alignment is the same for all pointers in the system. With this page structure, it is possible to find the page start by masking the address of any heap allocated object on the page with a mask based on the page alignment (bitwise-and operation). A plurality of flags are established on a page.

This Summary introduces concepts in a simplified form that are further described below in the Detailed Description. This Summary is not intended to identify key features or essential features of the claimed subject matter, nor is it intended to be used as an aid in determining the scope of the claimed subject matter. The term 'techniques', for instance, refers to device(s), system(s), method(s) and/or computer-readable instructions as permitted by the context above and throughout the content.

BRIEF DESCRIPTION OF THE FIGURES

The detailed description refers to the following accompanying drawings.

DETAILED DESCRIPTION

Overview

Figure 1:
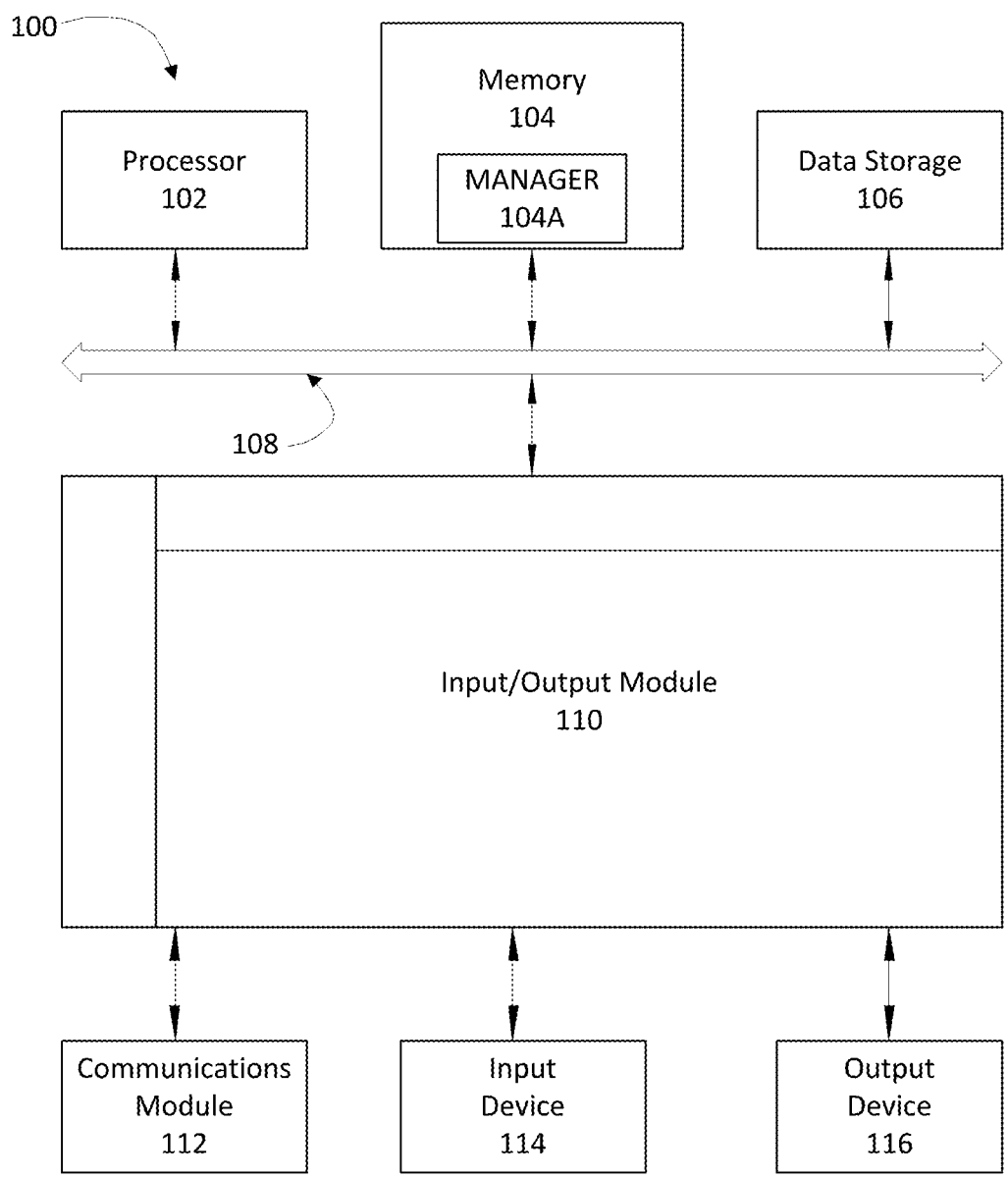
FIG. 1 displays a high-level block diagram of example system architecture in which the garbage collection techniques described herein can be employed.

In managing computer memory, it would be helpful to be able to switch quickly between different read and write barriers that are efficient for the garbage collection strategy and the state that the read and write barriers support. Described herein are memory managing techniques to provide read and write barriers for flexible and efficient garbage collection. A memory heap is split into pages. A page is a fixed-length contiguous block of virtual memory. Virtual memory is a memory management technique that virtualizes a computer's various forms of data storage (such as random-access memory and disk storage), allowing a program to be designed as though there is only one kind of memory.

Each page is aligned to an address that is a multiple of a particular power of two. When generating read and write operations, software code is generated to execute the write barrier or the read barrier. At this point, the memory manager knows what the page alignment is for each pointer; for example, if the page alignment is the same for all pointers.

With this page structure it is possible to find the page start by masking the address of any heap allocated object on the page with a mask based on the page alignment (bitwise-and operation). A mask is data that is used for bitwise operations. A bitwise operation operates on one or more bit patterns or binary numerals at the level of their individual bits. A bitwise operation is a fast, primitive action directly supported by the processor used to manipulate values for comparisons and calculations.

A number of flags are established on a page. A flag is one or more bits that are used to store a binary value or code that has an assigned meaning. A write barrier is split for the assignment of form 'holder.slot=value' into filtering parts and implementing parts. The filtering parts include one or more checks, where at least one check is based on more than one flag.

Checks consist of getting two flags, one flag from the page containing the holder and one from the page containing the value. These two flags are combined in some way, with one or more branch or call instructions that can divert control flow to the implementing part. A branch is sequence of code in a computer program that is conditionally executed depending on whether the flow of control is altered or not (at the branching point). A call starts a subroutine of the memory manager.

For example, these two flags can be combined using a 'logical and' operation; that is, both flags have to be set in order for control flow to be diverted to the implementing part of the write barrier. Other ways to read the flags or other per-page data, and to do the checks, can be utilized. Examples include basing control flow decisions on arithmetic operations (+ − * /), other bitwise and logical Boolean operations (and, or, xor) or comparing operations (less than, greater than, equals, etc.).

This brief overview, as well as section titles and corresponding summaries, are provided for the reader's convenience and are not intended to limit the scope of the claims or the proceeding sections.

Read and Write Barriers

In a previous approach to providing read and write barriers, the memory manager would execute implementing code. Changing the write or read barrier was achieved either by patching the out-of-line code, or by modifying data on which the out-of-line code depends. An out-of-line code sequence is a series of instructions that are invoked by a simplified calling mechanism in which almost no state-saving is required, called a stub. In this approach, the write barrier code was in a write barrier stub, which was subject to patching to change the write barrier. The throughput performance of this approach suffered because of the overhead of always calling out-of-line code, even when nothing needed to be done.

In another previous approach to provide read barriers, filtering code that does not depend on flags associated with the memory pages was generated inline. Flags refer to one or more bits used to store a binary value or code that has an assigned meaning. Flags are members of a defined data structure, such as a database record. The meaning of the value contained in a flag is generally defined in relation to the data structure of which the flag is part. One unrelated use of flags is to mark or designate data structures for future processing.

In this approach, the inlined filtering code was patched to implement the change of write barriers in the running system. This approach was associated with considerable complexity, since the system would need to patch dynamically generated code outside the tightly controlled context of the stubs. This required work for each code generator, to make sure that the code generated was in a format that could be recognized and patched safely by the code patching routines. This approach also was associated with a big pause: when the write barrier state was changed, time was spent scanning generated code looking for places where the code needs to be patched and time would be spent performing the code patching.

Another previous approach was a simplified version of the prior approach in which no patching took place, and where the system reserved a contiguous range of the virtual memory space for the 'new space'. Write operations where the value pointer was not in the new space range were filtered out, so that the write operations did not result in execution of the write barrier implementation part. The filtering part of the write barrier checked whether the value pointer was in this range with a few fast instructions. If the reserved range was aligned and sized at boundaries divisible by the same power-of-two, then bitwise operations could be used for the filtering. This was fast, but this approach was un-reconfigurable to support a different garbage collection strategy or state.

Another previous approach to provide read and write barriers was described in A. Appel, "Simple Generational Garbage Collection and Fast Allocation", 19(2) *Software Practice and Experience,* 171-183 (1989b). In this approach, some data was recorded (typically the value together with the object or the slot or both) for each write that was performed. When the amount of data recorded in this way reached some limit, the recorded data was processed in a way that considers the current write barrier.

This approach was wasteful because data was required to be recorded even for write operations that needed to take no write barrier action. This approach could be implemented with various tradeoffs of inlined code and out-of-line code. A similar approach was described in R. Hudson and A. Diwan, "Adaptive garbage collection for Modula-3 and Smalltalk", OOPSLA '90 Workshop on Garbage Collection, Ottawa, Ontario, Canada, (October 1990) and A. Hosking, J. Moss, and D. Stefanovic, "Comparative Performance Evaluation of Write Barrier Implementations", OOPSLA'92 ACM Conference on Object-Oriented Systems, Languages and Applications, 27(10) ACM SIGPLAN Notices, 92-109, Vancouver, British Columbia. ACM Press (1992). This approach used a hash table instead of a linear store to record data on write operations with similar disadvantages. This approach worked only for a write barrier, not for a read barrier.

Another previous approach to provide read and write barriers was to base the filtering on the data from a single page, either the page containing the value, or the page containing the slot or the page containing the start of the 'obj'. This has been widely implemented, sometimes with hardware support, but has efficiency issues with filter calls and branches to the implementing code.

Another previous approach to provide read and write barriers was described in D. Detlefs, C. Flood, S. Heller, and T. Printezis, "Garbage Collection", First Garbage Collection Proceedings of The 2004 International Symposium on Memory Management. The heap is divided into large pages called 'regions'. The inlined filter filtered out all pointers where the value and the object/slot were in the same region. The way the filter works could not be changed, so this approach was less flexible.

System Architecture

FIG. 1 displays a high-level block diagram of an example system architecture in which the garbage collection techniques described herein can be employed. The computer system 100 can include, in addition to hardware, code stored in memory 104. A bus couples the memory 104 for storing information and instructions executable by processor 102. Special purpose logic circuitry can supplement or incorporate the processor 102 and the memory 104. The memory 104 includes a memory manager 104A.

The instructions may be stored in the memory 104 and implemented in one or more computer program products. Computer program products can be one or more modules of computer program instructions encoded on a computer readable medium for execution by, or to control the operation of, the computer system 100. Memory 104 may store temporary variable or other intermediate information during execution of instructions executable by the processor 102.

The computer system 100 further includes a data storage device 106 coupled to bus 108. The data storage device 106 stores information and instructions. An input/output module 110 may couple the computer system 100 to various devices. Examples of input/output modules 110 include data ports such as universal serial bus (USB) ports. The input/output module 110 is configured to connect to a communications module 112. Examples of communications modules 112 include networking interface cards, such as Ethernet cards and modems.

The input/output module 110 is configured to connect to a number of devices, such as an input device 114 and/or an output device 116. Examples of input devices 114 include a keyboard and a pointing device such as, for example, a mouse, by which a user can provide input to the computer system 100. Examples of output devices 116 include display devices such as, for example, a liquid crystal display (LCD) monitor for displaying information to the user.

According to one aspect, the techniques can be implemented using a computer system 100 in response to processor 102 executing one or more sequences of one or more instructions contained in memory 104. Another machine-readable medium, such as data storage device 106, may read such instructions into memory 104. Execution of the sequences of instructions contained in memory 104 causes processor 102 to perform the process steps described herein.

Figure 2:
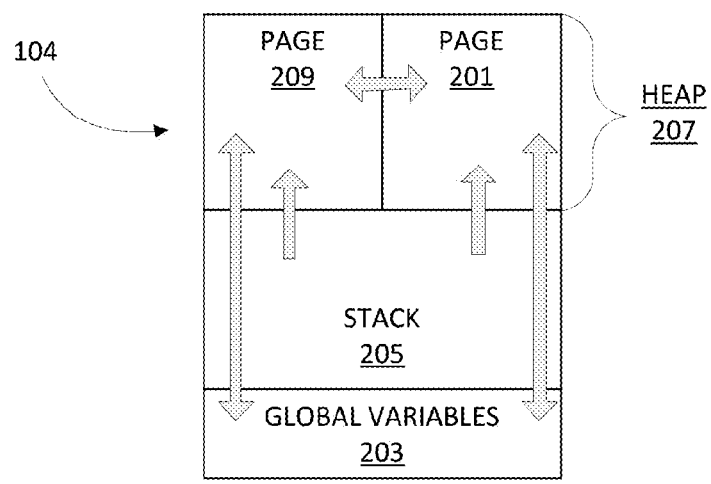
FIG. 2 displays a high-level block diagram of example memory in which the garbage collection techniques described herein can be employed.

FIG. 2 displays a high-level block diagram of example memory in which the garbage collection techniques described herein can be employed. Memory 104 includes a global variables segment 203, a stack 205, and a heap 207. The global variables segment 203 holds global variables associated with the applications on the system. Global variables are variables that are accessible in every scope (unless shadowed), as opposed to local variables with no shared memory.

The stack 205 and the heap 207 are used for data. The stack 205 is used for automatic variables within functions. Data is stored in the stack 205 using the last-in-first-out (LIFO) method. The stack 205 and its associated registers are used for temporary storage of information in which the most recently stored item is the first to be retrieved.

The heap 207 is used for dynamic memory allocation. Blocks of memory are allocated and freed in an arbitrary order. The pattern of allocation and size of blocks are not known until run time. The heap 207 is used for many different purposes. The stack 205 is much faster than the heap 207, but the stack 205 also is smaller and more expensive. The heap 207 is implemented using multiple pages of memory. Here two pages, 201 and 209, have been shown. Pointers represented here by arrows show the references between different parts of the memory.

Most object-oriented languages have some defined structure, and some come with the so-called main( ) function. When a program begins running, the system calls the function main( ) which marks the entry point of the program. For example, C, C++, or C# programs have one function named main( ). No other function in the program can be called main( ). The memory allocated in the heap 207 is used and reused during program execution. Memory allocated in the heap 207 may contain garbage values left over from previous usage.

Improved Read and Write Barriers

Figure 3:
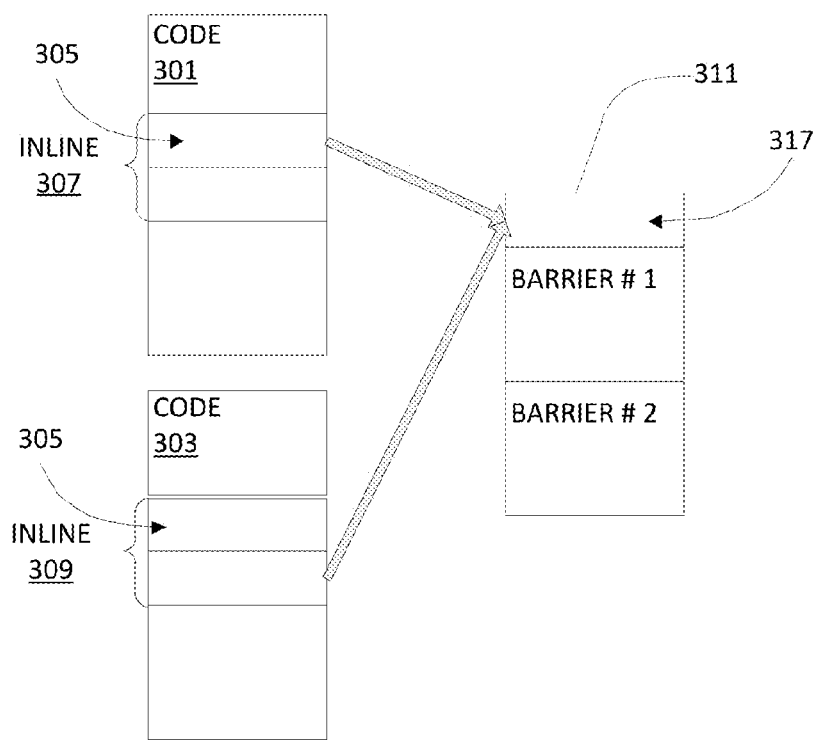
FIG. 3 displays an example of an arrangement of software code that employs the garbage collection techniques described herein.

As previously introduced, techniques to provide read and write barriers for flexible and efficient garbage collection are described. Referring to FIG. 3, two example pieces of software code 301, 303 are seen. Each piece of code has an inlined filtering part 305 of the barrier 307, 309, where the flags are combined in the filter and the subroutine call optionally moves execution to the out-of-line barrier implementation 311. The two different barriers (barrier #1 and barrier #2) between which the system can choose in this example each have an implementing part. The two out-of-line implementing parts are drawn in one box 317. At the top of the out-of-line barrier implementation 311 is an instruction that can be patched to either a no operation performed (NOP) or a branch to barrier #2. This shows the benefit of reusing out-of-line write barrier code in terms of space usage.

Figure 4:
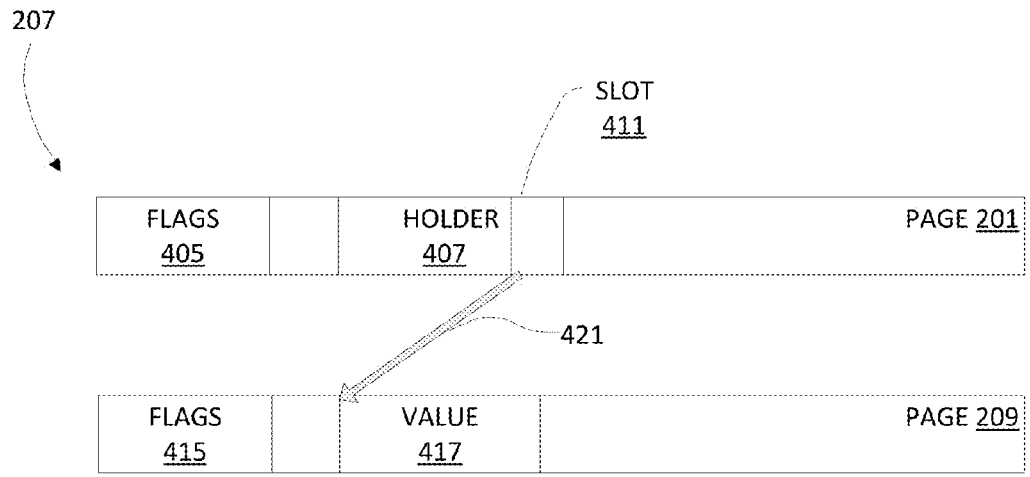
FIG. 4 displays a block diagram of an example heap in which the garbage collection techniques described herein can be employed.

Referring to FIG. 4, detail of an example heap 207 is seen. The heap 207 includes page 201 and page 209. Page 201 includes flags 405 and a holder object 407. Contained within holder object 407 is a slot 411. Page 209 includes flags 415 and value object 417. The pointer 421 from the slot 411 in the holder object 407 points to the value object 417. The holder object 407 and the value object 417 are on two different pages. The flags 405, 415 on each page are shown at the start of the page.

Figure 5:
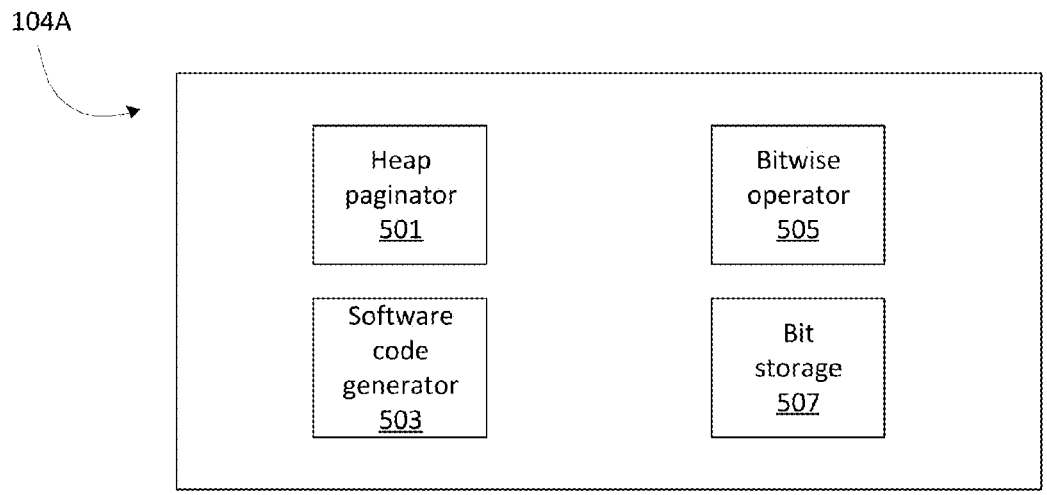
FIG. 5 displays a high-level block diagram of example memory manager in which the garbage collection techniques described herein can be employed.

FIG. 5 displays a high-level block diagram of an example memory manager in which the garbage collection techniques described herein can be employed. A heap paginator 501, a software code generator 503, a bitwise operator 505, and bit storage 507 are provided. The heap paginator 501 is configured to split a memory heap into a plurality of pages. Each page of the memory heap is aligned to an address that is a multiple of a particular power of two.

The software code generator 503 is configured to execute a read or write barrier when read or write operations are performed, knowing the page alignment for each pointer. The bitwise operator 505 is configured to mask the address of a heap allocated object on the page, based on the page alignment to find a page start. Bit storage 507 is configured to establish a plurality of flags on a page.

The software code generator 503 further splits a write barrier for the assignment of form holder.slot=value into filtering parts and implementing parts. The filtering parts include one or more checks. At least one check is based on more than one flag. The flags are combined in some way, with one or more conditional branch or call instructions that can divert control flow to the implementing part.

Figure 6:
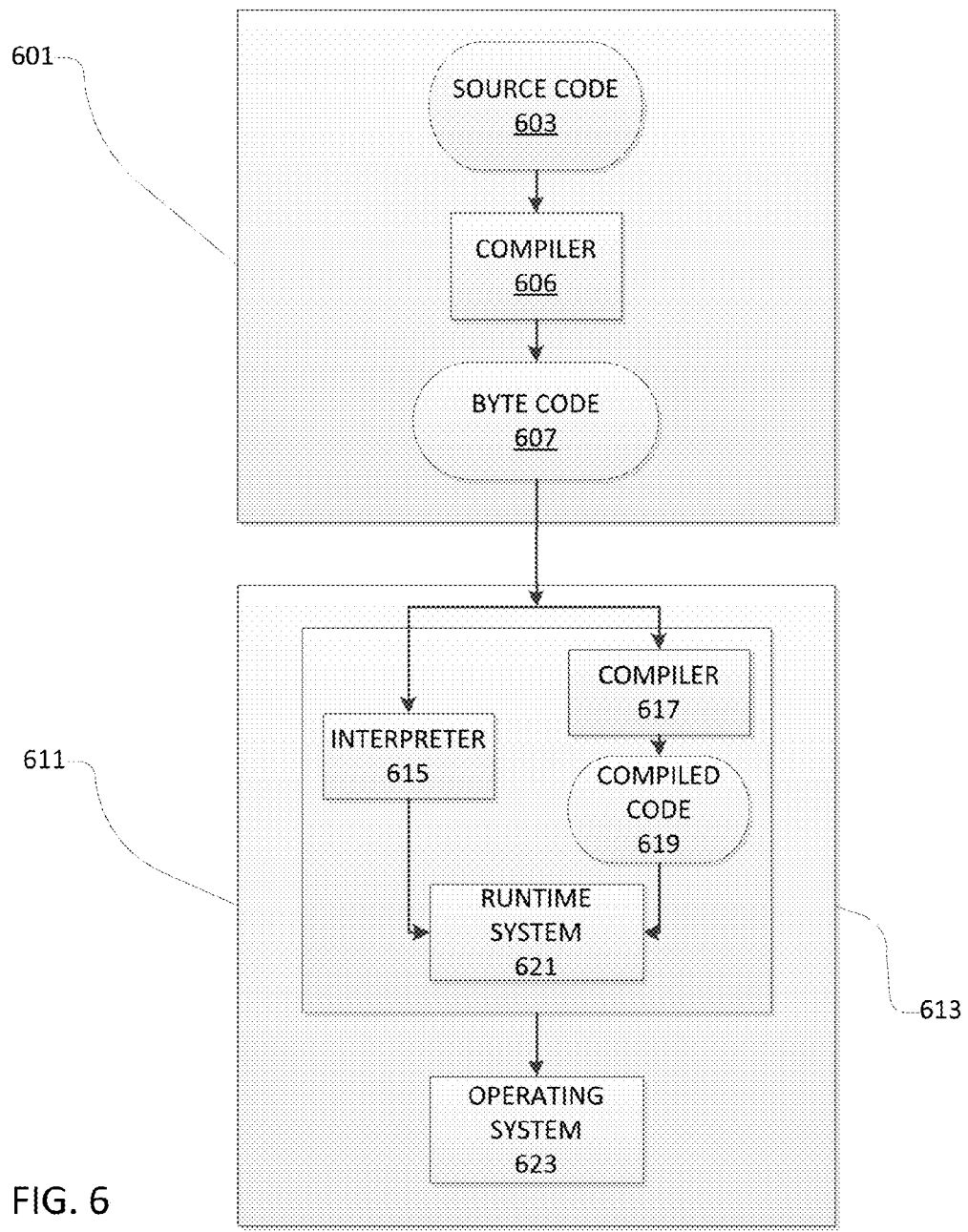
FIG. 6 illustrates a schematic diagram illustrating a source-code compilation operation according to an example implementation of the garbage collection techniques described herein.

FIG. 6 illustrates a schematic diagram illustrating a source-code compilation operation according to an example implementation of the garbage collection techniques described herein. A human applications programmer produces source code 603 written in a high-level language. A compiler 606 typically converts that code into 'class files'. Class files include routines written in instructions for a 'virtual machine' that various processors can be configured to emulate. These routines are called 'byte codes' 607.

Because conversion into byte codes is almost always separated in time from when the byte codes execute, FIG. 6 divides the sequence into a 'compile-time environment' 601 separate from a 'run-time environment' 611 in which the byte codes execute. One example of a high-level language for which compilers are available to produce such virtual-machine instructions is the Java® programming language. Java® is a registered trademark of Oracle Corporation, Inc., 500 Oracle Parkway, Redwood Shores, Calif. 94065.

Typically, a processor under control of a virtual-machine process 613 executes the byte-code routines of the class files. That process emulates a virtual machine from whose instruction set the byte codes are drawn. As is true of the compiler 606, the virtual-machine process 613 may be specified by code stored on a local disk or some other machine-readable medium from which it is read into memory to configure the computer system to implement the garbage collector and otherwise act as a virtual machine. Again, though, the persistent storage of that code may instead be provided by a server system remote from the processor that implements the virtual machine, in which case the code would be transmitted electrically or optically to the virtual-machine-implementing processor.

In some implementations, action of the virtual machine in executing the byte codes is referred to as 'interpreting'. FIG. 6 depicts the virtual machine as including an interpreter 615 for that purpose. In addition to or instead of running an interpreter, many virtual-machine implementations actually compile the byte codes concurrently with the resultant object code's execution, so FIG. 6 depicts the virtual machine as additionally including a just-in-time compiler 617.

Both of these organizations are merely exemplary, and many systems employ hybrid mechanisms, which partake of the characteristics of traditional compilers and traditional interpreters. The garbage collection techniques described herein are applicable independently of whether a batch compiler, a just-in-time compiler, an interpreter or some hybrid is employed to process source code. In addition, the garbage collection techniques described herein also apply to byte codes, so the filtering part of the barrier could be in the byte codes and/or the interpreter rather than in the 'compiled code'.

Some of the functionality that source-language constructs specify can be complicated, requiring many machine-language instructions for their implementation. One quite-common example is a source-language instruction that calls for 64-bit arithmetic on a 32-bit machine. More germane to the garbage collection techniques described herein is the operation of dynamically allocating space to a new object; this may require determining whether enough free memory space is available to contain the new object and, if not, reclaiming space.

In such situations, the compiler may produce inline code to accomplish these operations. That is, object-code instructions for carrying out a given source-code-prescribed operation are repeated each time the source code calls for the operation. But inlining runs the risk that code bloat will result if the operation is invoked at many source-code locations.

The natural way of avoiding this result is instead to provide the operation's implementation as a procedure. A single code sequence can be called from any location in the program. In the case of compilers, a collection of procedures for implementing many types of source-code-specified operations is called a runtime system for the language. The run-time system is a software component designed to support the execution of computer programs written in some computer language. The memory manager is largely implemented as a part of the run-time system.

The compiler and its runtime system are designed together so that the compiler 'knows' what runtime-system procedures are available in the target computer system and can cause desired operations simply by including calls to procedures that the target system already contains. To represent this fact, FIG. 6 includes a block to show that the compiler's output makes calls to the runtime system 621 as well as to the operating system 623, which consists of procedures that are similarly system resident but are not compiler-dependent.

Although the FIG. 6 arrangement is popular, it is by no means universal, and many further arrangements can be expected. Proposals have even been made to implement the behavior of the virtual machine 613 in a hardware processor, in which case the hardware itself would provide some or all of the garbage collection function. In short, garbage collectors can be implemented in a wide range of combinations of hardware and/or software.

By implementing garbage collection, a computer system greatly reduce the occurrence of memory leaks and other software deficiencies in which human programming frequently results. But garbage collection can also have significant adverse performance effects if not implemented carefully. From the garbage collector's point of view, what the mutator does is mutate the connectivity of active objects.

Some garbage collection approaches rely heavily on interleaving garbage collection steps among mutator steps. In one type of garbage collection approach, for instance, the mutator operation of writing a reference is followed immediately by garbage collector steps used to maintain a reference count in the header of that object. The code for subsequent new-object storage includes steps for finding space occupied by objects whose reference count has fallen to zero. Such an approach can slow mutator operation significantly.

Other approaches interleave very few garbage collector-related instructions into the main mutator process, but instead interrupt it from time to time to perform garbage collection intervals. The garbage collector finds unreachable objects and reclaims their memory space for reuse. Typically, the mutator allocates space within the heap by invoking the garbage collector, which at some level manages access to the heap.

Basically, the mutator asks the garbage collector for a pointer to a heap region where the garbage collector can safely place the data. The garbage collector keeps track of the fact that the thus-allocated region is occupied. The garbage collector refrains from allocating that region in response to any other request until the garbage collector determines that the mutator no longer needs the region allocated to that object.

Garbage collectors need to cooperate with not only the compiler that is used to produce the executable version of the mutator, but also the underlying operating system. A garbage collector provides an interface between the operating system (or virtual machine) and the user program for allocation and deallocation of heap memory. Other interactions between the operating system and user programs remain unchanged. Typically, a garbage collector seeks a large chunk of memory from the operating system and services all allocation requests by the mutator.

A runtime system (or virtual machine) for a programming language supports garbage collection, which reclaims memory when it is no longer in use by the program written in the programming language. The memory managed by the garbage-collecting system is called the heap. The system typically includes write barriers. A write barrier is code executed after pointers have been written to the heap. Write barriers ensure that the garbage collection subsystem stays consistent.

The runtime system has several different garbage collection strategies between which the runtime system can switch, to minimize pause times, while maximizing application throughput. Each strategy includes several states. For each strategy and state there is a different write barrier that needs to be active. It would be helpful to be able to switch quickly between different write barriers that are efficient for the garbage collection strategy and state that the write barriers' support.

The runtime system may also include read barriers. A read barrier is code executed after a pointer is read from the heap. The read barrier ensures that the pointer is pointing correctly when data has been moved to a different place by the system. As with write barriers, it would be helpful to be able to switch quickly between different read barriers that are efficient for the garbage collection strategy and state that the read barriers support.

The runtime system has several different garbage collection strategies between which it can switch, to minimize pause times, while maximizing application throughput. Each strategy includes several states. For each strategy and state, a different read barrier is active.

Figure 7:
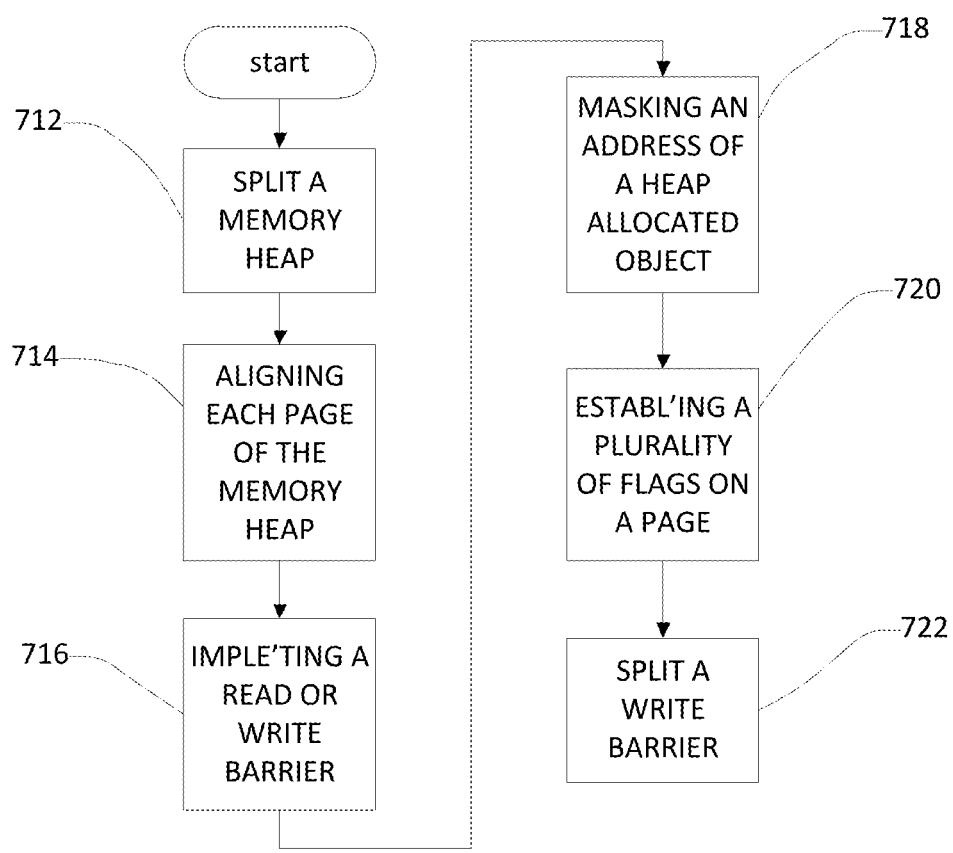
FIG. 7 illustrates a flow chart of an example process in which the garbage collection techniques described herein can be employed.

Referring to FIG. 7, a flow chart of an example process in which the garbage collection techniques described herein can be employed is seen. The memory heap is split into pages 712. The pages 201, 209 can be seen in FIG. 2. Each page 201, 209 is aligned to an address that is a multiple of a particular power of two 714.

When the code generator 503 generates code to perform read and write operations, the code generator 503 generates code that executes the write barrier or read barrier 716. At this point, the code generator 503 knows what the page alignment is for each pointer; for example, if the page alignment is the same for all pointers in the system. With this page structure it is possible to find the page start by masking the address of any heap allocated object on the page with a mask based on the page alignment (bitwise-and operation) 718.

The bit storage 507 establishes a plurality of flags on a page 720. In one implementation, each page 201, 209, has two flags; provided that in other implementations each page 201 209 could have more than two flags. These flags can be placed at fixed offsets from the start of the page 201, 209 (in the header). Alternatively, each page can have an index, which index is found in the header or obtained from its address by shifting the address to the right. This index can be used to access the flags in a separate page table.

In an example implementation, in a system with a write barrier the flags for each page 201, 209 can include:
POINTERS_TO_HERE_ARE_INTERESTING
POINTERS_FROM_HERE_ARE_INTERESTING In an example implementation, in a system with a read barrier two more flags for each page 201, 209 can include:
POINTERS_READ_FROM_HERE_ARE_INTERESTING
POINTERS_READ_TO_HERE_ARE_INTERESTING A write barrier for the assignment of form 'holder.slot=value' is split into a filtering part and an implementing part 722. The filtering part is generated inline in the code stream. The implementing part may be generated inline or out-of-line. The filtering part consists of checks based on flags from at least two pages, with one or more conditional branch or call instructions that can divert control flow to the implementing part.

The flags for the page 201 containing the start of holder are checked to have the POINTERS_FROM_HERE_ARE_INTERESTING flag set, and the page 209 containing the start of value is checked to have the POINTERS_TO_HERE_ARE_INTERESTING flag set. If the flags are located in a page table (not in the page header), then the page containing slot can be used instead of the page containing holder. The flags are combined in some fast way, for example, with a Boolean operation, on which the check can depend. If both flags are found to be set, execution jumps to the implementing part of the write barrier.

If the system contains read barriers, then the read barriers can be implemented in a similar way. A read barrier of the form 'value=holder.slot' is split into a filtering part and an implementing part. The filtering part is generated inline in the code stream. The implementing part may be generated inline or out out-of-line. The filtering part includes checks based on flags from at least two pages with one or more conditional branch or call instructions that can divert control flow to the implementing part.

The flags for the page 201 containing the start of holder are checked to have the POINTERS_READ_FROM_HERE_ARE_INTERESTING flag set, and the page 209 containing the start of value is checked to have the POINTERS_READ_TO_HERE_ARE_INTERESTING flag set. If the flags are located in a page table (not in the page header), then the page containing slot can be used instead of the page containing holder. If both flags are found to be set, execution jumps to the implementing part of the read barrier.

If the implementing part of the write barrier or read barrier is out-of-line, the implementing part may optionally be present in many versions. Each version is specialized for the particular registers that contain the addresses of some or all of holder, slot, and value, so argument passing overhead is reduced.

If the implementing parts of the write barrier or read barrier are implemented out-of-line, then the implementing parts are referred to as the write barrier stub and the read barrier stub. The implementing parts may contain or reference code implementing possible write or read barriers used in the system (for example, incremental marking write barrier, incremental compaction write barrier, and generational write barrier).

Different parts of the implementing parts of the write barrier or read barrier can be enabled and disabled by patching, for example by patching unconditional jumps in the code to no operation performed (NOPs) and vice versa. This is advantageous if the implementing parts of the write and read barriers are generated out-of-line in stubs.

Write barrier stubs and read barrier stubs are registered with a runtime system. Write barrier stubs and read barrier stubs can be patched quickly because their number is typically small compared to the number of generated code read or write operations that call the write and read barrier stubs. Alternatively, other means (for example, instructions with conditional behavior based on data) can control the different modes of operation for the stubs. This is advantageous if the implementing part is inlined in the generated code, where it would be complex and time consuming to patch.

When the write barrier or read barrier is switched (for example, from a simple generational collector to an incremental marking collector, or in order to re-categorize one or more pages in the system), the runtime: optionally iterates over and configures write barrier stubs appropriately by patching; iterates over pages that became important to track for writes or reads (or became unimportant to track for writes or reads); and switches write or read flags appropriately.

Thus, the techniques described herein provide read and write barriers for flexible and efficient garbage collection

CONCLUDING NOTES

The techniques described herein are not inherently related to any particular hardware or other apparatus. In certain aspects, the techniques described herein may be implemented using hardware or a combination of software and hardware, either in a dedicated server, or integrated into another entity, or distributed across multiple entities. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable entity that can perform calculations or other manipulations of information.

In addition to hardware, the techniques described herein may be described herein may be implemented using code that creates an execution environment. Code can constitute processor firmware, a protocol stack, a database management system, an operating system, or a combination of one or more of them stored in memory. Memory can include random access memory (RAM), flash memory, read only memory (ROM), programmable read-only memory (PROM), erasable PROM (EPROM), registers, hard disks, removable disks, compact disks (CD) ROM, a digital-versatile disks (DVD), or any other suitable storage device.

The instructions may be stored in memory and implemented in one or more computer program products. Examples of computer program products include one or more modules of computer program instructions encoded on a computer readable medium for execution by, or to control the operation of, the system, and according to any method known in the art.

The implementation described herein is not limited to any particular programming language. Examples of such programming languages include data-oriented languages (for example, SQL, dBase), system languages (for example, C, Objective-C, C++, Assembly), architectural languages (for example, Java, .NET), and application languages (for example, PHP, Ruby, Perl, JavaScript, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages.

A computer program as discussed herein does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, subprograms or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

In addition to a keyboard and a pointing device, other kinds of input devices can be used to provide for interaction with a user as well, such as a tactile input device, visual input device, audio input device or brain-computer interface device. For example, feedback provided to the user can be any form of sensory feedback, for example, visual feedback, auditory feedback, or tactile feedback; and input from the user can be received in any form, including acoustic, speech, tactile or brain wave input.

In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the techniques described herein can be implemented in a computing system that includes a back-end component, for example, as a data server; or that includes a middleware component, for example, an application server; or that includes a front-end component, for example, a client computer having a graphical user interface or a Web browser, or any combination of one or more such back-end, middleware, or front-end components.

The components of the system can be interconnected by any form or medium of digital data communication, for example, a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The term 'machine-readable storage medium' or 'computer readable medium' as used herein refers to any medium or media that participates in providing instructions to processor for execution. Such a medium may take many forms, including, but not limited to, non-volatile media, volatile media, and transmission media. Non-volatile media include, for example, optical or magnetic disks. Volatile media include dynamic memory. Transmission media can include coaxial cables, copper wire, and fiber optics, including the wires that comprise a bus.

Examples of machine-readable media include floppy disks, flexible disks, hard disks, magnetic tape, any other magnetic medium, compact disks (CD), digital-versatile disks (DVD), any other optical medium, punch cards, paper tape, random-access memory (RAM), programmable-read-only memory (PROMs), erasable-programmable-read-only memory (EPROMs), any other memory chip or cartridge, or any other medium from which a computer can read. The machine-readable storage medium can be a machine-readable storage device, a machine-readable storage substrate, a memory device, a composition of matter affecting a machine-readable propagated signal or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the techniques described herein should not be understood as requiring such separation in all aspects, and it should be understood that the described program components and systems can generally be integrated together in a single software product or packaged into multiple software products.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. A memory manager comprising:
a heap paginator configured to split a memory heap into a plurality of pages, with each page of the memory heap aligned to an address that is a multiple of a particular power of two, wherein each page includes a plurality of pointers;
a software code generator configured to generate code to execute a write barrier when write operations are performed, wherein a page alignment for each of the plurality of pointers is known;
a bitwise operator configured to determine a page start of a respective page of the plurality of pages by masking an address of a heap allocated object on the respective page based on bitwise-and operation page alignment; and
a bit storage configured to establish a plurality of flags on a particular page,
wherein the software code generator is further configured to split a write barrier for an assignment into filtering parts and implementing parts, wherein the filtering parts comprise one or more checks, wherein at least one check of the one or more checks is based on more than one flag, wherein the one or more checks are combined with one or more conditional branches or call instructions that can divert control flow to the implementing parts.

2. The memory manager of claim 1, wherein the software code generator is further configured to generate a write barrier knowing that the page alignment is the same for all pointers in the system.

3. The memory manager of claim 1, wherein the bit storage is further configured to establish the plurality of flags on the particular page, wherein an index is used to access the flags in a page table having the plurality of flags.

4. The memory manager of claim 1, wherein the software code generator is further configured to enable and disable different parts of the implementing parts of the write barrier by patching unconditional jumps in the code to no operation performed and vice versa.

5. The memory manager of claim 1, wherein the software code generator is further configured to control different modes of operation for barrier stubs by enabling and disabling different parts of the implementing parts of the write barrier by patching.

6. The memory manager of claim 1, wherein the software code generator is further configured to control different modes of operation for barrier stubs with instructions with conditional behavior based on data.

7. The memory manager of claim 1, wherein the software code generator is further configured to perform a runtime operation when a write barrier is switched, the runtime operation selected from a group consisting of iterating over write barrier stubs and configuring write barrier stubs by patching, iterating over pages that became important to track for writes (or became unimportant to track for writes) and switching their flags, and combinations thereof.

8. The memory manager of claim 1, wherein the bit storage is further configured to establish the plurality of flags on the particular page by placing the flags at fixed offsets from the start of the page.

9. The memory manager of claim 1, wherein the bit storage is further configured to establish a plurality of flags selected from a group consisting of:
POINTERS_TO_HERE_ARE_INTERESTING, and
POINTERS_FROM_HERE_ARE_INTERESTING.

10. The memory manager of claim 1, wherein the software code generator is further configured to generate the filtering parts inline in a code stream.

11. The memory manager of claim 1, wherein the software code generator is further configured to combine the flags using a Boolean operation.

12. The memory manager of claim 1, wherein the software code generator is further configured to generate the implementing parts out-of-line.

13. The memory manager of claim 12, wherein the software code generator is further configured to register write barrier stubs with a runtime system.

14. A method implemented by one or more computing devices configured to provide barriers for garbage collection, the method comprising:
splitting a memory heap into a plurality of pages, with each page aligned to an address that is a multiple of a particular power of two, wherein each page includes a plurality of pointers;
generating, by a source code generator, code to execute a write barrier, when the source code generator generates write operations, wherein a page alignment for each of the plurality of pointers is known;
determining a page start of a respective page of the plurality of pages by masking an address of a heap allocated object on the respective page with a mask based on bitwise-and operation page alignment;
establishing a plurality of flags on a particular page, and
splitting a write barrier for an assignment into filtering parts and implementing parts, wherein the filtering parts comprise one or more checks, wherein at least one check of the one or more checks is based on more than one flag, wherein the one or more checks are combined with one or more conditional branches or call instructions that can divert control flow to the implementing parts.

15. The method of claim 14, further comprising establishing the plurality of flags on the particular page, wherein an index is used to access the flags in a page table having the plurality of flags.

16. The method of claim 14, further comprising controlling different modes of operation for barrier stubs with instructions with conditional behavior based on data.

17. The method of claim 14, further comprising establishing the plurality of flags on the particular page by placing the flags at fixed offsets from the start of the page.

18. The method of claim 14, further comprising generating the filtering parts inline in a code stream.

19. One or more non-transitory computer-readable media storing processor-executable instructions that, when executed, cause one or more processors to perform operations that provide barriers for garbage collection, the operations comprising:
  splitting a memory heap into a plurality of pages, with each page aligned to an address that is a multiple of a particular power of two, wherein each page includes a plurality of pointers;
  generating, by a source code generator, code to execute a write barrier, when the source code generator generates write operations, wherein a page alignment for each of the plurality of pointers is known;
  determining a page start of a respective page of the plurality of pages by masking an address of a heap allocated object on the page with a mask based on bitwise-and operation page alignment;
  establishing a plurality of flags on a particular page; and
  splitting a write barrier for an assignment into filtering parts and implementing parts, wherein the filtering parts comprise one or more checks, wherein at least one check of the one or more checks is based on more than one flag, wherein the one or more checks are combined with one or more conditional branches or call instructions that can divert control flow to the implementing parts.

20. The one or more non-transitory computer-readable media storing processor-executable instructions of claim 19, further comprising while generating the write barrier, knowing that the page alignment is the same for all of the plurality of pointers.

21. The one or more non-transitory computer-readable media storing processor-executable instructions of claim 19, further comprising establishing the plurality of flags on the particular page by placing the flags at fixed offsets from the start of the page.

22. The one or more non-transitory computer-readable media storing processor-executable instructions of claim 19, further comprising combining the flags using a Boolean operation.

23. A memory manager comprising:
  a heap paginator configured to split a memory heap into a plurality of pages, with each page of the memory heap aligned to an address that is a multiple of a particular power of two, wherein each page includes a plurality of pointers;
  a software code generator configured to generating code to execute a read barrier when read operations are performed, wherein a page alignment for each of the plurality of pointers is known;
  a bitwise operator configured to determine a page start of a respective page of the plurality of pages by masking an address of a heap allocated object on the respective page based on bitwise-and operation page alignment; and
  bit storage configured to establish a plurality of flags on a particular page
  wherein the software code generator is further configured to split a read barrier for a read operation into filtering parts and implementing parts, wherein the filtering parts comprise one or more checks, wherein at least one check of the one or more checks is based on more than one flag, wherein the one or more checks are combined with one or more conditional branches or call instructions that can divert control flow to the implementing parts.

24. The memory manager of claim 23, wherein the software code generator is further configured to generate a read barrier knowing that the page alignment is the same for all pointers in the system.

25. The memory manager of claim 23, wherein the bit storage is further configured to establish the plurality of flags on the particular page, wherein an index is used to access the flags in a page table having the plurality of flags.

26. The memory manager of claim 23, wherein the software code generator is further configured to enable and disable different parts of the implementing parts of the read barrier by patching unconditional jumps in the code to no operation performed and vice versa.

27. The memory manager of claim 23, wherein the software code generator is further configured to control different modes of operation for barrier stubs with instructions with conditional behavior based on data.

28. The memory manager of claim 23, wherein the bit storage is further configured to establish the plurality of flags on the particular page by placing the flags at fixed offsets from the start of the page.

29. The memory manager of claim 23, wherein the bit storage is further configured to establish a plurality of flags selected from a group consisting of:
  POINTERS_READ_FROM_HERE_ARE_INTERESTING, and
  POINTERS-READ-TO-HERE-ARE-INTERESTING.

30. The memory manager of claim 23, wherein the software code generator is further configured to generate the filtering parts inline in a code stream.

31. The memory manager of claim 23, wherein the software code generator is further configured to combine the flags using a Boolean operation.

32. The memory manager of claim 23, wherein the software code generator is further configured to generate the implementing parts out-of-line.

33. The memory manager of claim 23, wherein the software code generator is further configured to register read barrier stubs with a runtime system.

34. A method implemented by one or more computing devices configured to provide barriers for garbage collection, the method comprising:
  splitting a memory heap into a plurality of pages, with each page aligned to an address that is a multiple of a particular power of two, wherein each page includes a plurality of pointers;
  generating, by a source code generator, code to execute a read barrier, when the source code generator generates read operations, wherein a page alignment for each of the plurality of pointers is known;
  determining a page start of a respective page of the plurality of pages by masking an address of a heap allocated object on the respective page with a mask based on bitwise-and operation page alignment;
  establishing a plurality of flags on a particular page, and
  splitting a read barrier for a read operation into filtering parts and implementing parts, wherein the filtering parts comprise one or more checks, wherein at least one check of the one or more checks is based on more than one flag, wherein the one or more checks are combined with one or more conditional branches or call instructions that can divert control flow to the implementing parts.

35. The method of claim 34, further comprising establishing the plurality of flags on the particular page, wherein an index is used to access the flags in a page table having the plurality of flags.

36. The method of claim 34, further comprising controlling different modes of operation for the barrier by enabling and disabling different parts of the implementing parts of the read barrier by patching.

37. The method of claim 34, further comprising establishing the plurality of flags on the particular page by placing the flags at fixed offsets from the start of the page.

38. The method of claim 34, further comprising combining the flags using a Boolean operation.

39. One or more non-transitory computer-readable media storing processor-executable instructions that, when executed, cause one or more processors to perform operations that provide barriers for garbage collection, the operations comprising:
  splitting a memory heap into a plurality of pages, with each page aligned to an address that is a multiple of a particular power of two, wherein each page includes a plurality of pointers;
  generating, by a source code generator, code to execute a read barrier, when the source code generator generates read operations, wherein a page alignment for each of the plurality of pointers is known;
  determining a page start of a respective page of the plurality of pages by masking an address of a heap allocated object on the page with a mask based on bitwise-and operation page alignment;
  establishing a plurality of flags on a particular page; and
  splitting a read barrier for a read operation into filtering parts and implementing parts, wherein the filtering parts comprise one or more checks, wherein at least one check of the one or more checks is based on more than one flag, wherein the one or more checks are combined with one or more conditional branches or call instructions that can divert control flow to the implementing parts.

40. The one or more non-transitory computer-readable media storing processor-executable instructions of claim 39, further comprising while generating the read barrier, knowing that the page alignment is the same for all of the plurality of pointers.

41. The one or more non-transitory computer-readable media storing processor-executable instructions of claim 39, further comprising establishing the plurality of flags on the particular page by placing the flags at fixed offsets from the start of the page.

42. The one or more non-transitory computer-readable media storing processor-executable instructions of claim 39, further comprising generating the filtering parts inline in the code stream.

* * * * *